US008776105B2

(12) United States Patent
Sinha et al.

(10) Patent No.: US 8,776,105 B2
(45) Date of Patent: Jul. 8, 2014

(54) METHOD AND SYSTEM FOR AUTOMATIC CONTENT RECOGNITION PROTOCOLS

(71) Applicant: Turner Broadcasting System, Inc., Atlanta, GA (US)

(72) Inventors: Nishith Kumar Sinha, Mableton, GA (US); Donald Jude Loheide, Mableton, GA (US); Matthew Paul Giles, Marietta, GA (US)

(73) Assignee: Tuner Broadcasting System, Inc., Atlanta, GA (US)

( * ) Notice: Subject to any disclaimer, the term of this patent is extended or adjusted under 35 U.S.C. 154(b) by 0 days.

(21) Appl. No.: 13/730,656

(22) Filed: Dec. 28, 2012

(65) Prior Publication Data

US 2013/0205321 A1 Aug. 8, 2013

Related U.S. Application Data

(60) Provisional application No. 61/596,012, filed on Feb. 7, 2012.

(51) Int. Cl.
*H04N 21/422* (2011.01)
(52) U.S. Cl.
USPC .................. 725/19; 725/18; 725/20
(58) Field of Classification Search
CPC ...................................... H04N 21/422
USPC ............................... 725/19, 18, 20
See application file for complete search history.

(56) References Cited

U.S. PATENT DOCUMENTS

| 5,437,050 A | 7/1995 | Lamb et al. |
| 5,874,686 A | 2/1999 | Ghias et al. |

(Continued)

FOREIGN PATENT DOCUMENTS

| EP | 1485815 | 10/2007 |
| EP | 1354276 | 12/2007 |
| JP | 11055201 | 2/1999 |
| WO | WO9517746 | 6/1995 |

OTHER PUBLICATIONS

Blackburn, Steven G., "Content Based Retrieval and Navigation of Music," University of Southampton Faculty of Engineering and Applied Science, Department of Electronics and Computer Science, Mar. 10, 1999.

(Continued)

*Primary Examiner* — Benjamin R Bruckart
*Assistant Examiner* — Michael M Nguyen
(74) *Attorney, Agent, or Firm* — Arent Fox LLP

(57) ABSTRACT

Systems, methods and/or techniques for automatic content recognition protocols are described. A method may be executed in a media device having an automatic content recognition application programming interface. The method may include generating one or more video fingerprints that correspond to video content that displays on the media device. The method may include communicating the one or more video fingerprints to an automatic content recognition backend system. The automatic content recognition backend system compares the one or more video fingerprints with one or more stored video fingerprints and determines whether a match occurs. If the match occurs, one or more event identifiers associated with the one or more video fingerprints may be received from the automatic content recognition backend system. The one or more event identifiers may be communicated to an application server, and one or more interactive events may be received from the application server.

18 Claims, 11 Drawing Sheets

(56) References Cited

U.S. PATENT DOCUMENTS

| | | | |
|---|---|---|---|
| 5,918,223 A | 6/1999 | Blum et al. | |
| 5,956,683 A | 9/1999 | Jacobs et al. | |
| 5,991,737 A | 11/1999 | Chen | |
| 6,121,530 A | 9/2000 | Sonoda | |
| 6,201,176 B1 | 3/2001 | Yourlo | |
| 6,314,577 B1 | 11/2001 | Pocock | |
| 6,408,272 B1 | 6/2002 | White et al. | |
| 6,504,089 B1 | 1/2003 | Nagasawa et al. | |
| 6,556,218 B1 | 4/2003 | Alcorn | |
| 6,760,720 B1 | 7/2004 | De Bellis | |
| 6,765,595 B2 | 7/2004 | Lee et al. | |
| 6,834,308 B1 | 12/2004 | Ikezoye et al. | |
| 6,968,337 B2 | 11/2005 | Wold | |
| 6,990,453 B2 | 1/2006 | Wang et al. | |
| 7,080,325 B2 | 7/2006 | Treibach-Heck et al. | |
| 7,174,293 B2 | 2/2007 | Kenyon et al. | |
| 7,190,971 B1 | 3/2007 | Kawamoto | |
| 7,194,752 B1 | 3/2007 | Kenyon et al. | |
| 7,266,343 B1 | 9/2007 | Yli-juuti et al. | |
| 7,363,278 B2 | 4/2008 | Schmelzer et al. | |
| 7,444,353 B1 | 10/2008 | Chen et al. | |
| 7,500,007 B2 | 3/2009 | Ikezoye et al. | |
| 7,529,659 B2 | 5/2009 | Wold | |
| 7,562,012 B1 | 7/2009 | Wold et al. | |
| 7,562,392 B1 | 7/2009 | Rhoads et al. | |
| 7,565,327 B2 | 7/2009 | Schmelzer | |
| 7,707,088 B2 | 4/2010 | Schmelzer | |
| 7,711,652 B2 | 5/2010 | Schmelzer | |
| 7,783,489 B2 | 8/2010 | Kenyon et al. | |
| 7,797,249 B2 | 9/2010 | Schmelzer et al. | |
| 7,870,574 B2 | 1/2011 | Kenyon et al. | |
| 7,877,438 B2 | 1/2011 | Schrempp et al. | |
| 7,917,645 B2 | 3/2011 | Ikezoye et al. | |
| 2002/0083060 A1 | 6/2002 | Wang et al. | |
| 2003/0055699 A1 | 3/2003 | O'Connor | |
| 2004/0034874 A1* | 2/2004 | Hord et al. | 725/136 |
| 2006/0031684 A1 | 2/2006 | Sharma et al. | |
| 2007/0192784 A1 | 8/2007 | Postrel | |
| 2008/0305815 A1* | 12/2008 | McDonough | 455/466 |
| 2008/0310731 A1 | 12/2008 | Stojancic et al. | |
| 2008/0313140 A1 | 12/2008 | Pereira et al. | |
| 2009/0106104 A1* | 4/2009 | Upendran et al. | 705/14 |
| 2009/0133049 A1 | 5/2009 | Bradley | |
| 2009/0317053 A1 | 12/2009 | Morley et al. | |
| 2010/0007797 A1 | 1/2010 | Stojancic | |
| 2010/0205628 A1 | 8/2010 | Davis et al. | |
| 2010/0303338 A1 | 12/2010 | Stojancic et al. | |
| 2010/0306193 A1 | 12/2010 | Pereira et al. | |
| 2010/0318515 A1 | 12/2010 | Ramanathan et al. | |
| 2011/0177775 A1* | 7/2011 | Gupta et al. | 455/3.06 |
| 2011/0311095 A1* | 12/2011 | Archer | 382/100 |
| 2011/0313856 A1* | 12/2011 | Cohen et al. | 705/14.49 |

OTHER PUBLICATIONS

Blackburn, Steven G., "Search by Humming," University of Southampton Faculty of Engineering, Department of Electronics and Computer Science, May 8, 1997.

Ghias, Asif et al, "Query by Humming—Musical Information Retrieval in an Audio Database," ACM Multimedia 95—Electronic Proceedings, Nov. 5-9, 1995, San Francisco, CA.

ProQuest, PR Newswire, New York, "Mobile Music: Comcast Cellular First in U.S. to Trial Breakthrough Interactive Music Service Call *CD," Feb. 11, 1999, p. 1.

Taylor, Chuck, "Company Lets Listeners Dial for CDs StarCD Turns Cell Phones Into Radio-Music Storefronts," Billboard: Jun. 26, 1999; 111, 26; General Interest Module, p. 86.

Tseng, Yuen-Hsien, "Content-Based Retrieval for Music Collections," SIGIR99 22nd Annual International ACM SIGIR Conference on Research and Development in Information Retrieval, Berkeley, CA, Aug. 15-19, 1999.

Whittle, Robin, "Future Developments in the Music Market," Contemporary Music Summit in Canberra Apr. 27, 1995, Apr. 11, 1995.

* cited by examiner

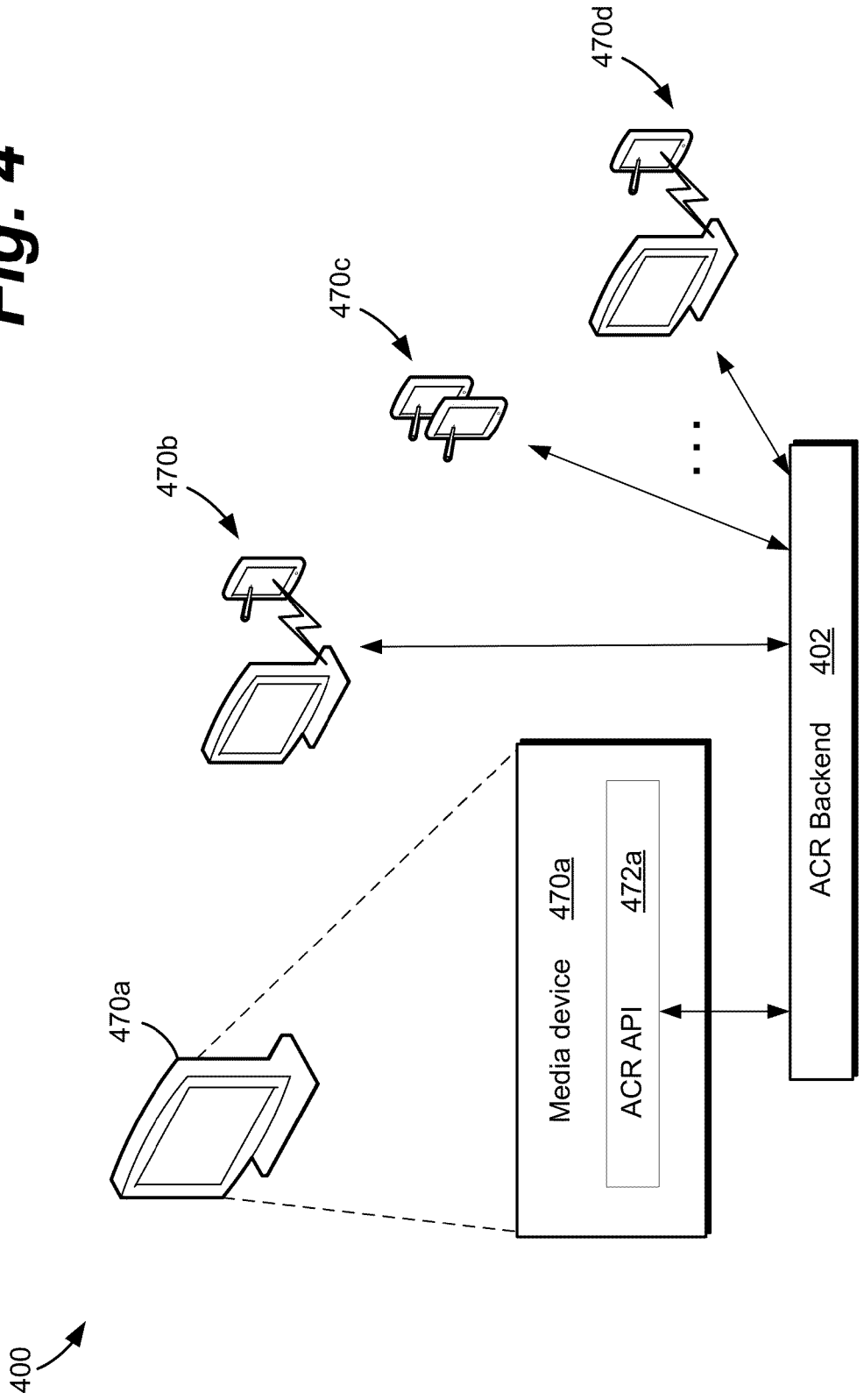

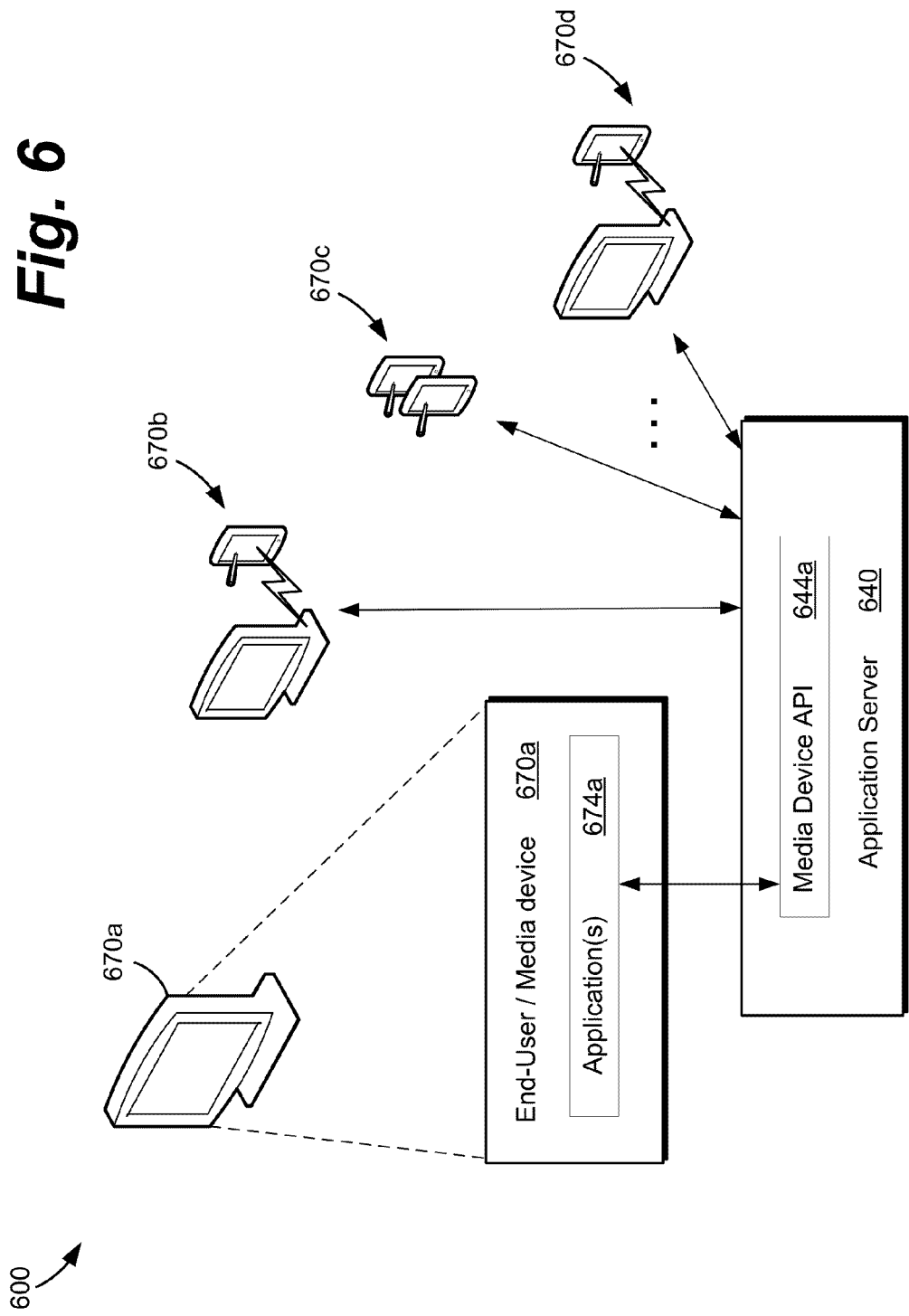

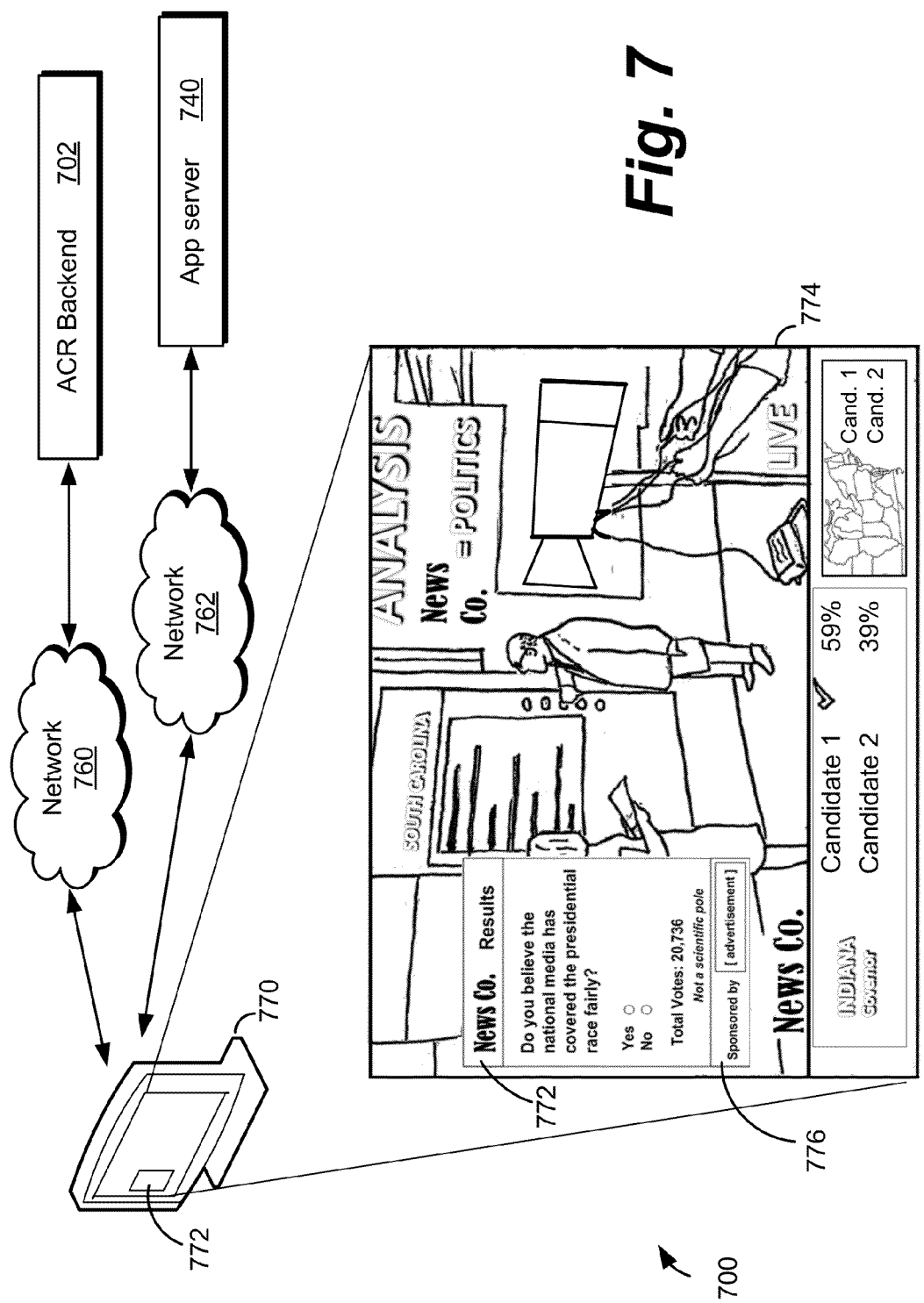

METHOD AND SYSTEM FOR AUTOMATIC CONTENT RECOGNITION PROTOCOLS

CROSS-REFERENCE TO RELATED APPLICATIONS

This application also makes reference to:
U.S. patent application Ser. No. 13/730,359, filed Dec. 28, 2012;
U.S. patent application Ser. No. 13/730,422, filed Dec. 28, 2012;
U.S. patent application Ser. No. 13/730,459, filed Dec. 28, 2012;
U.S. patent application Ser. No. 13/730,495, filed Dec. 28, 2012;
U.S. patent application Ser. No. 13/730,530, filed Dec. 28, 2012;
U.S. patent application Ser. No. 13/730,754, filed Dec. 28, 2012;
U.S. patent application Ser. No. 13/730,559, filed Dec. 28, 2012;
U.S. patent application Ser. No. 13/730,579, filed Dec. 28, 2012;
U.S. patent application Ser. No. 13/730,593, filed Dec. 28, 2012;
U.S. patent application Ser. No. 13/730,759, filed Dec. 28, 2012;
U.S. patent application Ser. No. 13/730,627, filed Dec. 28, 2012;
U.S. patent application Ser. No. 13/730,644, filed Dec. 28, 2012;
U.S. patent application Ser. No. 13/730,670, filed Dec. 28, 2012;
U.S. patent application Ser. No. 13/730,691, filed Dec. 28, 2012;
U.S. patent application Ser. No. 13/730,702, filed Dec. 28, 2012;
U.S. patent application Ser. No. 13/730,718, filed Dec. 28, 2012; and
U.S. patent application Ser. No. 13/730,734, filed Dec. 28, 2012.

Each of the above referenced applications is hereby incorporated herein by reference in its entirety.

FIELD OF THE INVENTION

Certain embodiments of the invention relate to content recognition. More specifically, certain embodiments of the invention relate to a method and system for automatic content recognition protocols.

BACKGROUND OF THE INVENTION

Smart or connected televisions (TVs) may receive data from data networks such as Internet networks that allow a viewer to not only access broadcast digital content, but also receive multimedia content. In addition viewers without Smart TVs can access additional content via a smart phone or tablet. With the proliferation of connected TVs and wireless communication devices such as smartphones and tablets, content or network providers now have a plethora of avenues for distributing media including programming, advertisements and interactive content.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for automatic content recognition protocols, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 4 is a high-level block diagram illustrating a portion of an exemplary automatic content recognition system, in accordance with one or more embodiments of the present invention.

FIG. 6 is a high-level block diagram that shows a portion of an automatic content recognition system, in accordance with one or more embodiments of the present invention.

FIG. 7 is a high-level block diagram that shows a portion of an exemplary automatic content recognition system, in accordance with an embodiment of the present invention.

DETAILED DESCRIPTION OF THE INVENTION

Figure 1:
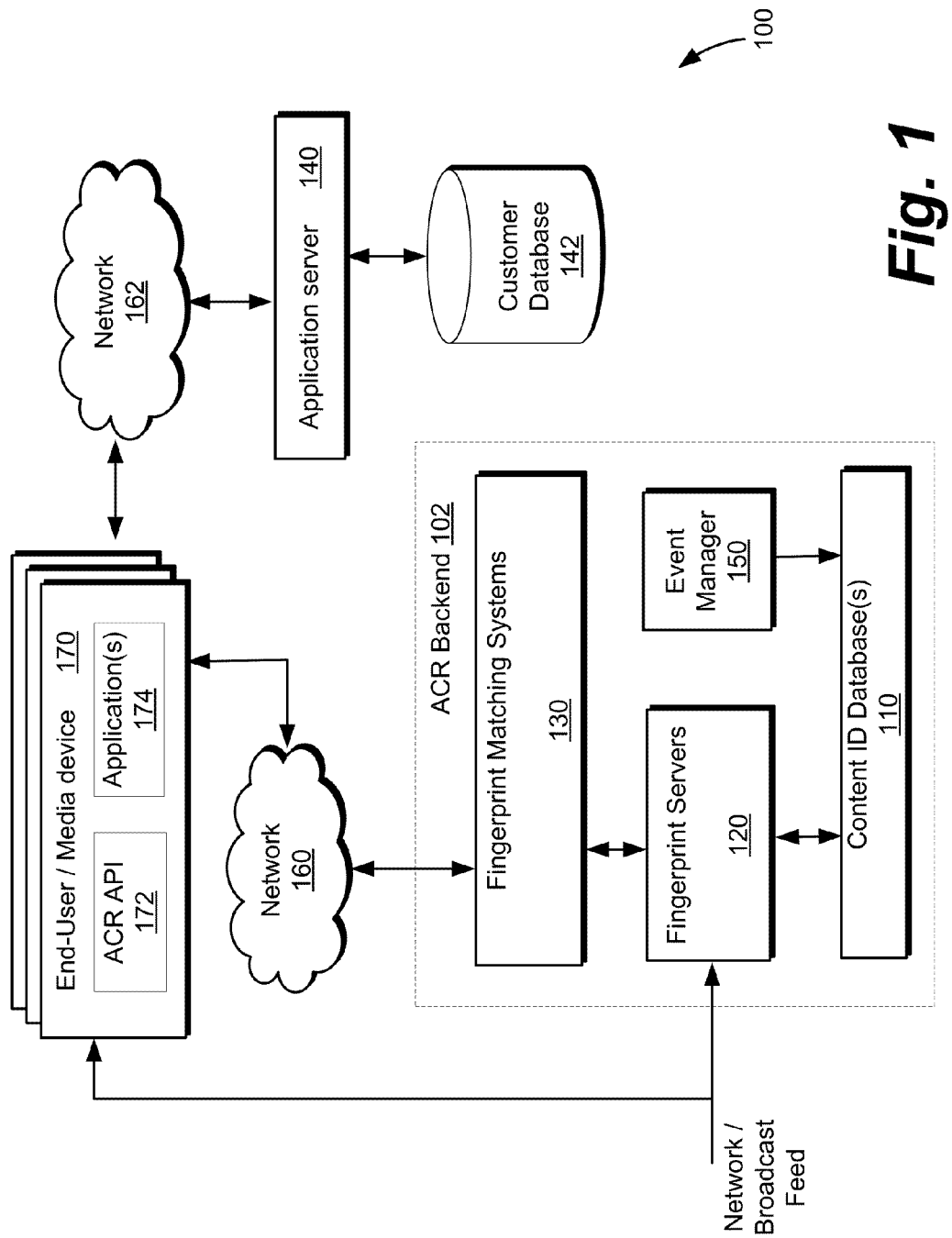
FIG. 1 is a high-level block diagram illustrating an exemplary automatic content recognition system, in accordance with one or more embodiments of the present invention.

Certain embodiments of the invention may be found in a method and system for automatic content recognition (ACR) protocols. Various embodiments of the invention may utilize ACR techniques described herein to detect matches between fingerprints associated with media that is displayed on a media device and fingerprints hosted by an ACR backend. In response to detecting a fingerprint match, the content recognition system may cause an interactive event to be communicated to and be executed on the media device. A viewer may interact with the interactive event, and the interactive event may be associated with a customer account hosted on an application server. Various embodiments of the present invention may utilize one or more interfaces to communicate between components, and the interfaces may conform to a communication protocol.

In various embodiments of the invention, a method may be executed in a media device that is operable to play video content. The media device may comprise an automatic content recognition application programming interface, which may be operable to generate one or more video fingerprints that correspond to video content that displays on the media device. The automatic content recognition application programming interface may be operable to communicate the one or more video and/or audio fingerprints to an automatic content recognition backend system. The automatic content recognition backend system may compare the one or more video and/or audio fingerprints with one or more stored video fingerprints and determines whether a match occurs. If the match occurs, one or more event identifiers associated with the one or more video fingerprints may be received from the automatic content recognition backend system via the automatic content recognition application programming interface. The method may comprise communicating the one or more event identifiers to an application server, and receiving from the application server one or more interactive events and an event timeline associated with the one or more event identifiers. In some exemplary embodiments of the invention, the method may comprise receiving a corresponding time of match from the automatic content recognition backend system, when the automatic content recognition backend system determines a match.

In some exemplary embodiments of the invention, an opt-in request may be received from the application server, and, in response to receiving the opt-in request, an overlay window that presents an opt-in choice may be displayed to a user to allow the user to determine whether to interact. In some exemplary embodiments of the invention, a response to the opt-in choice may be received from the user, and the response to the opt-in choice may be communicated to the application server. The application server may determine whether a customer account exists. In some embodiments of the invention, the application server may communicate with a customer database to determine whether a customer account exists. In some exemplary embodiments of the invention, a confirmation of a valid customer account may be received from the application server.

In some exemplary embodiments of the invention, displaying a registration window that allows a user to enter registration information may be displayed, when the application server determines that the customer account does not exist. The registration information may be communicated to the application server. The application server may cause a new customer account to be created in the customer database.

In some exemplary embodiments of the invention, the method may comprise generating a break structure related to the video content utilizing the event timeline. One or more of the interactive events may be associated with one or more playback times in the video content. The one or more interactive events may be executed by tracking the video content and referencing the break structure. The method may comprise receiving a user response to the one or more interactive events, generating user response data and transmitting the user response data to the automatic content recognition backend system. The method may comprise receiving a user response to the one or more interactive events, generating user response data and transmitted the user response data to the application server. In some exemplary embodiments of the invention, the application server utilizes a media device application programming interface to generate the one or more interactive events.

In some exemplary embodiments of the invention, the method may comprise continually (e.g., repeatedly) executing the generating one or more video fingerprints step, and continually (e.g., repeatedly) executing the receiving from the application server one or more interactive events step. The method may include updating information associated with the one or more interactive events or receiving one or more new interactive events.

FIG. 1 is a high-level block diagram illustrating an exemplary automatic content recognition system, in accordance with one or more embodiments of the present invention. Referring to FIG. 1, there is shown an automatic content recognition (ACR) system 100. The system 100 may comprise an ACR backend 102, an application server 140, one or more media devices 170 and one or more networks, for example networks 160, 162. In some examples, network 160 and network 162 may be the same network, for example the Internet. The ACR backend 102 may comprise one or more content ID databases 110, one or more fingerprint servers 120, one or more fingerprint matching systems 130, and an event manager 150. A live network/broadcast feed (shown in FIG. 1) may be provided to the system 100, and the same broadcast feed may be read/analyzed by media devices 170 (end-user devices) connected to system 100 and by fingerprint servers 120 (and for example other modules) included in system 100.

One or more components of the ACR backend 102 may be in communication with an NTP server (not shown) that may comprise suitable logic, circuitry, code, and/or interfaces that may be operable to provide timing information for handling, for example, synchronization and events for components and entities within the ACR system.

The fingerprint servers 120 may comprise suitable logic, circuitry, code, and/or interfaces that may be operable to handle fingerprinting and fingerprint communications to the fingerprint matching systems 130. Since each vendor or television manufacturer is likely to utilize its own fingerprint technology, each of the fingerprint servers 120 may be a dedicated server for each of the fingerprint technologies supported by the system 100. In some embodiments of the invention, a portion of one or more fingerprint servers 120 may be operable to perform video fingerprinting while a portion may be operable to perform audio fingerprinting. Fingerprint technologies from multiple vendors may utilize different computations to perform fingerprinting of video and/or audio frames. For example, each fingerprint technology may utilize a specific set of algorithms, parameters, operations, and/or data processing methods, for example. In some examples, one or more fingerprint servers may generate fingerprints from media content in a short amount of time, for example two seconds or less. Fingerprint servers 120 may fingerprint network content and send the fingerprints to a content ID database 110 to be associated with an event ID and then stored/hosted.

The content ID database 110 may comprise suitable logic, circuitry, code, and/or interfaces that may be operable store/host fingerprints of content, for example sent from fingerprint servers 120, and associated event IDs. Content ID database 110 may associate one or more fingerprints with an interactive event identifier. In one example, content fingerprints and/or associated video content may be provided by an entity that hosts/runs the application server.

The content ID database 110 may be operable to manage events provided by an event manager 150 and may assign interactive event IDs to live and/or archived network programming. In one example, archived video segments and/or associated fingerprints may be provided by an entity that hosts/runs the application server. The content ID database may be operable to communicate with multiple fingerprint servers 120 that may utilize multiple fingerprint technologies. The content ID database 110 may create and/or host a media timeline that comprises interactive event identifiers (IDs) assigned to the video fingerprints generated by the fingerprint servers 120.

The fingerprint matching systems 130 may comprise suitable logic, circuitry, code, and/or interfaces that may be operable to match fingerprints produced by the fingerprint servers 120 with fingerprints produced by the end-user devices 170. Each of the fingerprint matching systems 130 may correspond to a particular ACR or fingerprint technology. In this regard, each of the fingerprint matching systems 130 may be supported by a third party such as a TV manufacturer, for example. Additionally, one or more of the fingerprint matching systems 130 may be a hosted service, for example, cloud computing, etc., which may be accessible via the Internet.

The fingerprint servers 120 may be operable to send fingerprints, interactive event IDs and other information to their corresponding fingerprint vendors (fingerprint matching systems 130) through one or more networks (e.g., wireline networks, optical, hybrid fiber coaxial (HFC), wireless networks, etc.) and/or by utilizing one or more communication protocols. Communication between the fingerprint servers 120 and the fingerprint matching systems 130 may occur through one or more wireless and/or wireline communication links. The communication links described above may support one or more communication protocols. Accordingly, the fingerprint servers 120 and the fingerprint matching systems 130 may comprise suitable logic, circuitry, code, and/or interfaces to enable the use of the appropriate communication protocols.

The fingerprint matching systems 130 may be operable to compare fingerprints produced by the end-user devices 170 with fingerprints provided by the fingerprint servers. In some examples, the fingerprint matching systems 130 may detect whether a fingerprint match has occurred within a time period (for example, one second) of when the content appears on the media device 170. In some examples, the fingerprint matching systems 130 may detect fingerprint matches with a high accuracy (for example, at least 99.95%). In some examples, the fingerprint matching systems 130 may detect fingerprint matches where the video quality of the samples are less than pristine. When a match occurs, a fingerprint matching system 130 may indicate that an interactive event is to take place in an end-user device 170. These interactive events may allow a viewer of an end-user device 170 to be presented with information on the screen or display of an end-user device (such as advertisements, prompts to change channels or playback modes, notifications of coupons, games and the like) and may allow a viewer to interact with the information presented.

Communications between the fingerprint matching systems 130 and the end-user devices 170 may occur through one or more communication links and/or networks (e.g., wireline networks, optical, hybrid fiber coaxial (HFC), wireless networks, etc.), for example network 160, and/or by utilizing one or more communication protocols. The communication links and/or networks described above may support one or more communication protocols. Accordingly, the fingerprint matching systems 130 and the end-user devices 170 may comprise suitable logic, circuitry, code, and/or interfaces to enable the use of the appropriate communication protocols.

The application server 140 may comprise suitable logic, circuitry, code, and/or interfaces that may be operable to store or host (or contain address information related to the location of) one or more applications or interactive events. Applications and/or interactive events may be associated with an event ID, and for example a specific video fingerprint. In some examples, applications and/or interactive events associated with an event ID and/or fingerprint may be defined by an entity in charge of creating applications. The applications may be stored in the application server and the associated event ID and video fingerprint and/or segment may be provided to the ACR backend 102.

It should be understood that a system (for example, system 100) may include more than one application server, even though some of the figures and descriptions throughout this disclosure may refer to a single application server in order to describe certain aspects of the systems and methods of this disclosure. It should be understood that in some setups, an end-user device may have an application installed prior to the time that a fingerprint match, which is related to that device, is detected. In this setup, the application server may push an interactive event that displays and/or executes on the pre-installed application. In other setups and/or situations, the application itself may be pushed to the end-user device and the end-user device may be operable to handle and/or execute the application and interactive event. Various configurations may exist with respect to the end-user devices and the application server such that portions of the code, which may be operable to execute an interactive event on an end-user device may be pre-installed on the end-user device. Therefore, throughout this disclosure, when reference is made to an application or an interactive event being pushed or communicated from an application server, it may be understood that the application, or one or more portions thereof, may be pre-installed on the end-user device. Alternatively, the application server may push the application including the interactive event together.

The application server 140 may be operable to receive from an end-user device 170, information related to an interactive event ID. The information may be provided by the end-user device 170 in response to a match between a fingerprint that may be taken and/or generated by the end-user device and a fingerprint that may be taken and/or generated by a corresponding fingerprint server 120. In some embodiments of the present disclosure, the application server 140 may receive information related to an interactive event ID directly from the ACR backend 102 instead of or in addition to receiving information from an end-user device 170. Thus, in this regard, the end-user device may prompt the application server 140 for content, or the application server 140 may push the content to the end-user device. Therefore, throughout this disclosure, whenever reference is made to the end-user device requesting content from an application server (i.e., a pull), the application server may actually push the content to the end-user device, and vice versa with respect to references to application servers pushing content (i.e., the end-user device may instead request content from the application servers).

The application server 140 may be in communication with a customer database 142. The customer database 142 may collects/store/host customer account information related to one or more applications, media devices and/or users. For example, the customer database 142 may store technical details about a media device associated with a customer account. The customer database 142 may store personal information about one or more users associated with an account, for example a username, a password, an email address, payment information and the like. The customer database 142 may also be operable to receive and/or handle responses by viewers/users to applications, for example interactions with event overlay windows. The application server 140 may be operable to receive from an end-user device 170 user response data and communicate such data to the customer database 142. The application server 140 may be operable to retrieve account information and/or user response data from the customer database 142, and may communicate such information to one or more media devices 170.

The event manager 150 may comprise servers, computers, devices, user interfaces and the like that allow interaction between an administrative user (such as a partner or an event creator, director, etc.) and the ACR backend 102. The event manager 150 may enable interaction with a component that archives and analyzes video segments. The event manager 150 may comprise peripherals and/or interfaces whereby an entity that is responsible for creating/assigning event content may create and/or assign interactive events that synchronize to a live or replayed programming/video segments. The event manager 150 may communicate with a content ID database 110 to assign interactive event IDs to fingerprints associated with live or replayed programming and/or video segments. The event identifiers may be assigned to the appropriate fingerprints generated by the fingerprint servers 120. The event manager and/or content ID database may synchronization to appropriately assign the event identifiers to the right spot in a video and/or audio sequence.

The event manager 150 may be operable to receive one or more inputs from a user (e.g., an interactive director), and to generate based on those inputs, interactive event identifiers that can be communicated to the fingerprint servers where they can be associated with or assigned to the video fingerprints generated by the fingerprint servers. The event manager 150 may be operable to communicate the interactive event identifiers to a television system (e.g., legacy system) and/or to a web system. The interactive event identifiers may be utilized in the television system and/or in the web system to trigger interactive events. Moreover, the communication of the interactive event identifiers may be based on one or more of an EBIF, an HTTP live streaming (HLS), a satellite network protocol, or some other protocol.

The content ID database 110 may communicate event ID and/or fingerprint association information to the fingerprint servers 120. Each of the fingerprint servers 120 may then communicate the event identifiers and the fingerprints to its corresponding one of the fingerprint matching systems 130. The fingerprint matching systems 130 in turn receive fingerprints from their corresponding end-user devices 170 and try to match those fingerprints to the ones received from their corresponding fingerprint servers 120. When a match occurs, the event identifier and/or other information may be passed to the appropriate end-user device (and/or to an application server 140). Based on information determined by the fingerprint matching system 130, the end-user device may obtain application data, for example, interactive information (e.g., graphics, text, applications) from the application server 140.

Once a match occurs in one of the fingerprint matching systems 130 and the end-user device 170 (and/or the application server 140) obtains the appropriate information from its corresponding fingerprint vendor, the application server 140 communicate the appropriate content (such as an application or interactive event) to the end-user device that corresponds to the interactive event ID. The end-user device may communicate interactive event ID information to the application server 140 in order to request content or content may be pushed by the application server 140 to an end-user device without the device requesting it. In some embodiments of the invention, in order for an end-user device to accept content from an application server 140, the device may have to be logged and/or registered with an application, application provider, web service or the like. Additionally, the end-user device may need to have an appropriate ACR service running on the device that enables the media device to communicate with the application server and/or the ACR backend 102.

Figure 2:
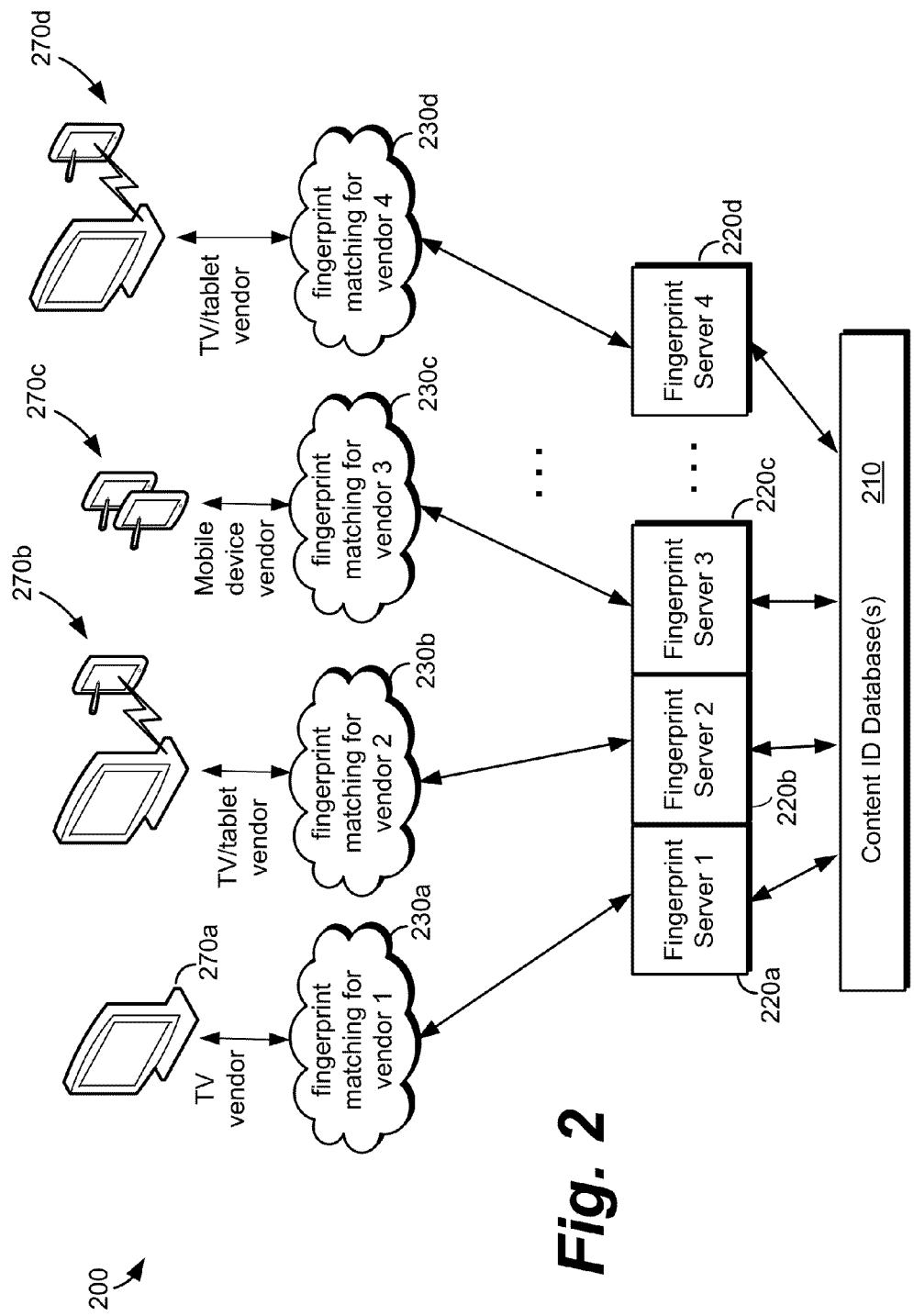
FIG. 2 is a high-level block diagram illustrating a portion of an exemplary automatic content recognition system, in accordance with one or more embodiments of the present invention.

The end-user devices 170 may comprise a plurality of devices such as connected TVs, connected TV with paired handheld and/or mobile devices (also referred to as second-screen devices) such as smartphones, PDAs and tablets, for example. As shown in FIG. 2, various end-user devices (media devices) such as connected (smart) TVs, smart TVs with paired hand-held (second-screen) devices, and even hand-held devices only may be connected via a network 260 to an ACR system (for example, similar to the system 100 of FIG. 1). In one setup, a single smart TV (device 270a) may be connected to an ACR system. In another setup, multiple devices 270b may be connected to an ACR system, for example where one device, such as a smart TV may be the primary end-user device, and one or more hand-held devices, such as tablets, PDAs or smart phones, may be second-screen devices. A second-screen device associated with the connected TVs may be a tablet (e.g., iPad, Samsung Galaxy, etc.), smartphone (e.g., iPhone, Android, etc.), or other like device, for example. In this setup, the second screen devices may either be in communication with the network 260 directly, or they may be in communication with the network via the primary device, or both.

It should be understood that in any particular media device(s) setup, not all of the devices need to be ACR-enabled devices. In some examples, one of the devices may an ACR-enabled device and the other may not be ACR-capable, but may still interact with the ACR-enabled device. Therefore, throughout this disclosure, whenever reference is made to an ACR-based device in a setup, it should be understood that not all of the devices need to be ACR-capable. Devices in a setup may also be referred to as media devices. Furthermore, throughout this disclosure, whenever reference is made to a single end-user device in a setup, it should be understood that the setup may comprise multiple end-user devices, and vice versa with respect to references to multiple end-user devices. In another setup, hand-held devices 270c, which may in some situations operate as second-screen devices, may act as one or more primary end-user devices and optionally one or more secondary end-user devices. In this setup, one or more hand-held devices may receive broadcast feed content and may also allow one or more users to interact with interactive events sent over the network 260. End-user devices may also be referred to as media devices, where an end-user device may be a media device that is utilized by a user to communicate with a system, such as an ACR system. The End-user devices may also be referred to as viewer devices, display devices, or ACR-based devices, for example.

Referring to FIG. 1, in a particular end-user device setup, for example a setup in a viewer's home, one or more devices may be connected to a system 100. Each device in a setup may be connected to an ACR backend 102 via a network 160, or via a separate end-user device that is part of the same setup. For example, a viewer may have a setup that includes a smart TV that connects to an ACR backend 102 via the network 160, and the viewer may also have a tablet (or other second-screen device) that communicates with the smart TV and allows the viewer to interact with content that is displayed on the smart TV, conversely the viewer may not have a Smart TV but have tablet (or other second screen device) that can communicate directly with the ACR backend 102 and Application Server 140. In some instances, the content displayed on such a second-screen device may coincide with the content that is displayed on the main end-user device, and this coincided content may allow a user or viewer to interact with content displayed on the main end-user device in a synchronized manner.

An end-user device 170 may comprise suitable logic, circuitry, code, and/or interfaces that may be operable to implement an ACR architecture/service that runs on the media device. The ACR architecture/service may adapt the media device to communicate with an ACR backend and/or one or more applications running on the media device. For example, the ACR architecture/service may adapt the media device to display overlay messages and permit customization of overlay messages, for example, with respect to the message's location, brand graphics, sponsorship text and/or logos and the like. The ACR architecture/service may adapt the media device to display and/or modify an overlay message based upon user initiated input and/or user responses. The ACR architecture/service may enable the media device to display an overlay message based upon ad hoc trigger, for example a trigger not associated with video fingerprint matching, (i.e., poll results). The ACR architecture/service may enable the media device to collect user interaction/user responses to overlay message, for example a political poll, question or the like. The ACR architecture/service may include a feature whereby a user can override control of automatic overlay events, for example to turn off automatic overlay windows.

An end-user device may be operable to present one or more applications 174 to a viewer. Applications 174 may be in communication with an ACR API. The applications, for example along with the ACR API, may adapt the media device to present text (including customized formatting, including new lines, pages, fonts and the like), window borders, wrappings and other graphics. The applications may adapt the media device to present customized overlay windows, for example designed by third parties. The applications may adapt the media device to present brand graphics and messages, sponsorship text and logos, graphs and other feedback images, for example, user response results from a poll.

An application programming interface (API) may be required for an application to run properly on a media device. In one example, the entity that maintains the application server 140 may utilize an API provided by the media device vendor to create applications that properly execute on the media device. In another example, a media device vendor may acquire a system API from the entity that maintains the application server, and the API may be implemented into the media device, adapting the media device to properly execute applications provided by the application server.

An end-user device 170 may include (or be in communication with) a media unit provided or supported by a television network or service provider, such as, for example, a set-top box, gateway, computer, tuner, other digital video device, etc. The media unit may read and/or analyze a network/broadcast feed (as shown in FIG. 1, for example) in order to display programming on the end-user device 170. The media unit may comprise a digital video recorder (DVR) component that is operable to record live programming for later replay or playback by a viewer, sometimes referred to as on demand viewing. An ACR system, for example, system 100, may be operable to analyze video and/or audio being played back on an end-user device via a DVR the same as it analyzes live programming. In this respect, an ACR system may analyze video and/or audio being played back via a DVR, generate fingerprints of the video, and send the fingerprints to a fingerprint matching system (for example, systems 130). A media unit and a smart TV or tablet (end-user device) may also be configured and operate such that the smart TV or tablet may communicate commands to the media unit. For example, a smart TV (with proper authentication, for example) may be operable to instruct a media unit to change channels, perform video playback functions, perform guide functions and the like. A media unit may comprise suitable logic, circuitry, code, and/or interfaces, and may utilize appropriate communication protocols to interact directly with a network, for example, the network 160. In this regard, a media unit may communicate data via a network or may receive commands via a network.

U.S. patent application Ser. No. 13/730,352, filed on Dec. 28, 2012, discloses additional detail of an exemplary ACR system.

FIG. 2 is a high-level block diagram illustrating a portion of an exemplary automatic content recognition system, in accordance with one or more embodiments of the present invention. Referring to FIG. 2, there is shown a portion 200 of an exemplary ACR system, which may comprise one or more end-user devices (devices 270a, . . . , 270d), one or more fingerprint matching systems (systems 230a, . . . , 230d), one or more fingerprint servers 220a, . . . , 220d, and a content ID database 210. As shown in FIG. 2, each end-user device (devices 270a, . . . , 270d) may support and/or utilize a different fingerprint technology, and therefore each end-user device may require its own fingerprint matching system (systems 230a, . . . , 230d). Accordingly, an ACR system may be operable to include fingerprint servers capable of communicating with some or all of the different fingerprint matching systems supported by the system. FIG. 2, shows how fingerprint servers 220a, . . . , 220d may be operable to communicate with distinct fingerprint matching systems 230a, . . . , 230d. These features may be implemented by having a central video fingerprint repository and management platform that facilitates triggering interactive events across various platforms regardless of the ACR vendor solution (e.g., fingerprinting technology). Such a system may be scalable and additional ACR vendor solutions may be added. A content ID database 201 and/or an event manager (not shown) may be operable to assign one or more interactive event identifiers to the different sets of video fingerprints (for example utilizing different fingerprint technologies) generated by the fingerprint servers 220a, . . . , 220d.

The End-user devices (for example, devices 230a, . . . , 230d) may utilize the same video and/or audio fingerprinting technology utilized by the associated fingerprint servers and supported by the associated fingerprint matching system vendors. The fingerprint vendor may be a vendor, manufacturer, or other third-party service provider that may comprise suitable logic, circuitry, code, and/or interfaces operable to provide hosted services over the Internet for the viewer devices. These services may comprise video and/or audio fingerprint matching as well as the delivery of any interactive event IDs associated with a match. The end-user devices may comprise suitable logic, circuitry, code, and/or interfaces that may be operable to take and send fingerprints to the fingerprint vendor for matching.

In operation, one or more components of an exemplary automatic content recognition system, for example the automatic content recognition (ACR) system 100 and 200 of FIGS. 1 and 2, may communicate with one another to perform one or more of the methods and/or techniques described herein. For example, one or more media devices may communicate with an ACR backend 102, for example to determine whether fingerprints generated by the media devices match fingerprints stored in the ACR backend 102. The ACR backend 102 may utilize a fingerprint matching system 130, and for example other components, to determine whether a fingerprint match has occurred. The ACR backend 102 may communicate with the media devices 170 to communicate information about a match. The media devices may communicate with an application server 140 using information received from the ACR backend 102 to request application data. The application server 140 may communicate with a customer database 142 to receive user-specific information. Additional details regarding the operation of exemplary automatic content recognition systems may be found in flow charts and related descriptions herein.

Figure 3:
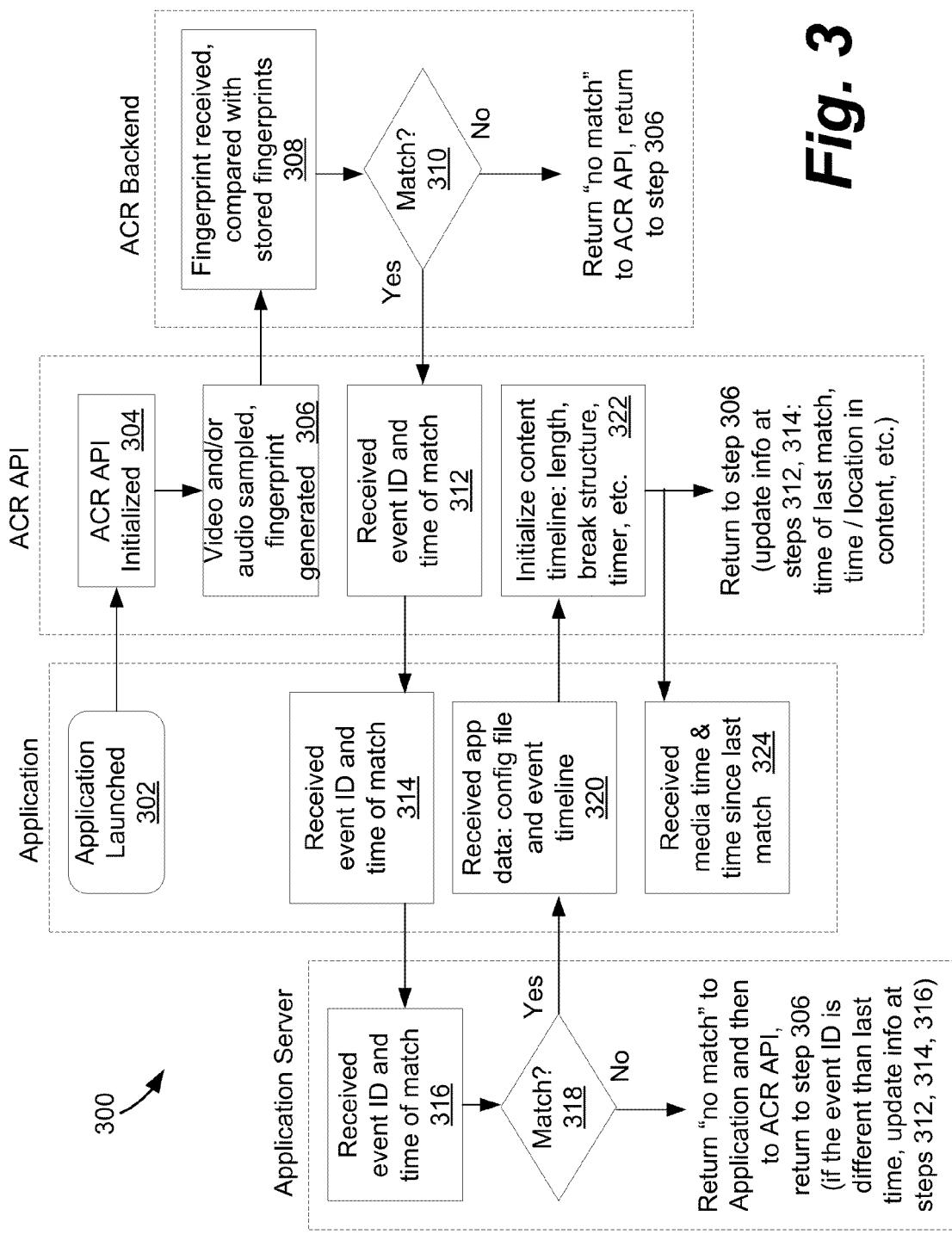
FIG. 3 is a flow diagram that shows exemplary steps in the operation of an exemplary automatic content recognition system, in accordance with one or more embodiments of the present invention.

FIG. 3 is a flow diagram 300 that shows exemplary steps in the operation of an exemplary ACR system, in accordance with one or more embodiments of the present invention. More specifically, FIG. 3 shows how some of the components of an ACR system (for example, the system of FIG. 1) may interface and/or communicate with each other. The interfaces between components may conform to a communication protocol, including an exemplary order of communications and/or operations. At step 302, an application (for example, application 174 of FIG. 1) may be launched on a media device. In some examples, the application may run continually in the background and/or the application may include a "listening agent" that continually monitors for events that require the application's attention. At step 304, when an application is running on the media device, an ACR API may be initialized and/or running. The ACR API may enable the media device to facilitate communication between an application and an ACR backend. At step 306, the ACR API, for example in conjunction with other components of the media device, may monitor the video and/or audio that displays or is heard on the media device. As the ACR API monitors the video and/or audio, it may sample video and/or audio segments and generate fingerprints and communicate fingerprints to the ACR backend.

At step 308, the ACR backend may accept and handle fingerprints for video segments communicated from the media device and/or ACR API. The ACR backend may then compare the communicated fingerprints to fingerprints stored within the ACR backend. For example, referring to FIG. 1, the ACR backend may utilize one or more fingerprint servers and one or more fingerprint matching systems. Referring again to FIG. 3, at step 310, the ACR backend may determine whether there is a match between the communicated fingerprints and the fingerprints stored within the ACR backend. If no match occurs, the ACR backend may communicate a "no match" signal to the media device and/or ACR API, in which case the ACR API may return to step 306. At step 312, if a match occurs, the ACR backend may communicate a "match" signal to the media device and/or ACR API along with other information, for example an interactive event ID and a time of match, associated with the fingerprint. At step 314, the ACR API may pass along the information associated with the fingerprint, including the event ID, to the application.

At step 316, the application on the media device may communicate with an application server. The application may communicate information associated with a matched fingerprint, including an event ID, to the application server. At step 318, the application server may determine whether it is hosting or has access to an application and/or interactive event associated with the event ID provided by the application. If no match occurs, the application server may communicate a "no match" signal to the media device and/or application. The application may then communicate the "no match" signal to the ACR API, in which case the ACR API may return to step 306. In this situation, where no application match occurred, when the ACR API again samples and fingerprints video (step 306), if the event ID received from the ACR backend is different than before, the new information associated with the recent fingerprint match may be updated at steps 312, 314, 316 so that the application server can attempt to find an application and/or interactive event associated with the updated event ID.

At step 320, if a match occurs in the application server, the application server may communicate application data associated with the application/interactive event to the media device and/or application. Application data may comprise a configuration file that instructs the application how to execute the interactive event. The application server may also communicate an event timeline related to fingerprinted content that instructs the application when to generate interactive events at certain offsets in video content. In addition the configuration file may leverage the ACR API to download the next few minutes of fingerprints of the matched content so subsequent matches can be performed local on the device reducing network traffic in a pre-recorded content scenario or it may leverage the ACR API to download the fingerprints of additional content such as a sponsorship advertisement so that matches can be performed more quickly when the ad plays on the broadcast telecast. In some embodiments of the invention, the application server may communicate an opt-in request to the media device, requesting that the media device, user register and/or login before complete application data is communicated to the media device. At step 322, the ACR API may utilize the event timeline to initialize video content. For example, the ACR API may determine the length of the relevant video content and create a break structure, such that certain interactive events are associated with certain times in the video content. At step 324, the ACR API may then communicate time and/or interactive event association information to the application such that the application may initiate interactive events at the appropriate times. The ACR API may continually sample and fingerprint video (step 306), so to some extent the flow diagram 300 may be a continuous cycle.

FIG. 4 is a high-level block diagram that shows a portion of an ACR system, in accordance with one or more embodiments of the present invention. As shown in FIG. 4, a variety of end-user devices 470a, . . . , 470d may be operable to properly communicate with an ACR backend 402 by way of an ACR API, for example, ACR API 742a. It is important to note that there may be multiple instances of the ACR backend 402 leveraging different fingerprint algorithms whether they be video or audio. In one example, a media device vendor (for example, the vendor of media device 470a) may acquire the ACR API 742a and then implement the ACR API 742a (for example, along with additional vendor specific interfacing) into the media devices manufactured by the vendor. In this example, the ACR API 742a, and for example the interface for the vendor, may be implemented within devices manufactured by the vendor. In another example, a vendor (for example, the vendor of media device 470a) may provide a vendor-specific API to the entity that maintains the ACR backend. In this example, the ACR backend may implement an API for each vendor, in which case the vendor API may be utilized within the ACR backend 402.

Application programming interfaces (API's) that allow various types of media devices to interface with a single ACR backend 402 may offer benefits. For example, an ACR API may allow an end-user device to generate fingerprints that are compatible with the ACR backend. An ACR API may allow an end-user device to associate fingerprint match messages/signals received from an ACR backend, and may allow the end user device to send interactive event IDs to an application server as a result. An ACR API may allow the media device to format content break structures related to an application and/or to interactive events, for example adding appropriate breaks/event triggers into content. An ACR API may allow the media device to associate media times with breaks/event triggers in content and communicate those media times to an application. In another example, the framework may enable the invocation of overlay windows, and may facilitate data communication between the media device and the ACR backend. In another example, the framework may enable the communication of content, data and other information between a media device and one or more second-screen devices.

In operation, one or more components of an exemplary automatic content recognition system, for example the automatic content recognition (ACR) systems 100 and 400 of FIGS. 1 and 4, may communicate with one another to perform one or more of the methods and/or techniques described herein. For example, one or more media devices may communicate with an ACR backend 102, for example to determine whether fingerprints generated by the media devices match fingerprints stored in the ACR backend 102. The media device may comprise an ACR application programming interface 172, 472a that enables the media device to communicate with the ACR backend 102, 402. The ACR backend 102 may utilize a fingerprint matching system 130, and for example other components, to determine whether a fingerprint match has occurred. The ACR backend 102 may communicate with the media devices 170 to communicate information about a match. The media devices may communicate with an application server 140 using information received from the ACR backend 102 to request application data. The application server 140 may communicate with a customer database 142 to receive user-specific information. Additional details regarding the operation of exemplary automatic content recognition systems may be found in flow charts and related descriptions herein.

Figure 5A:
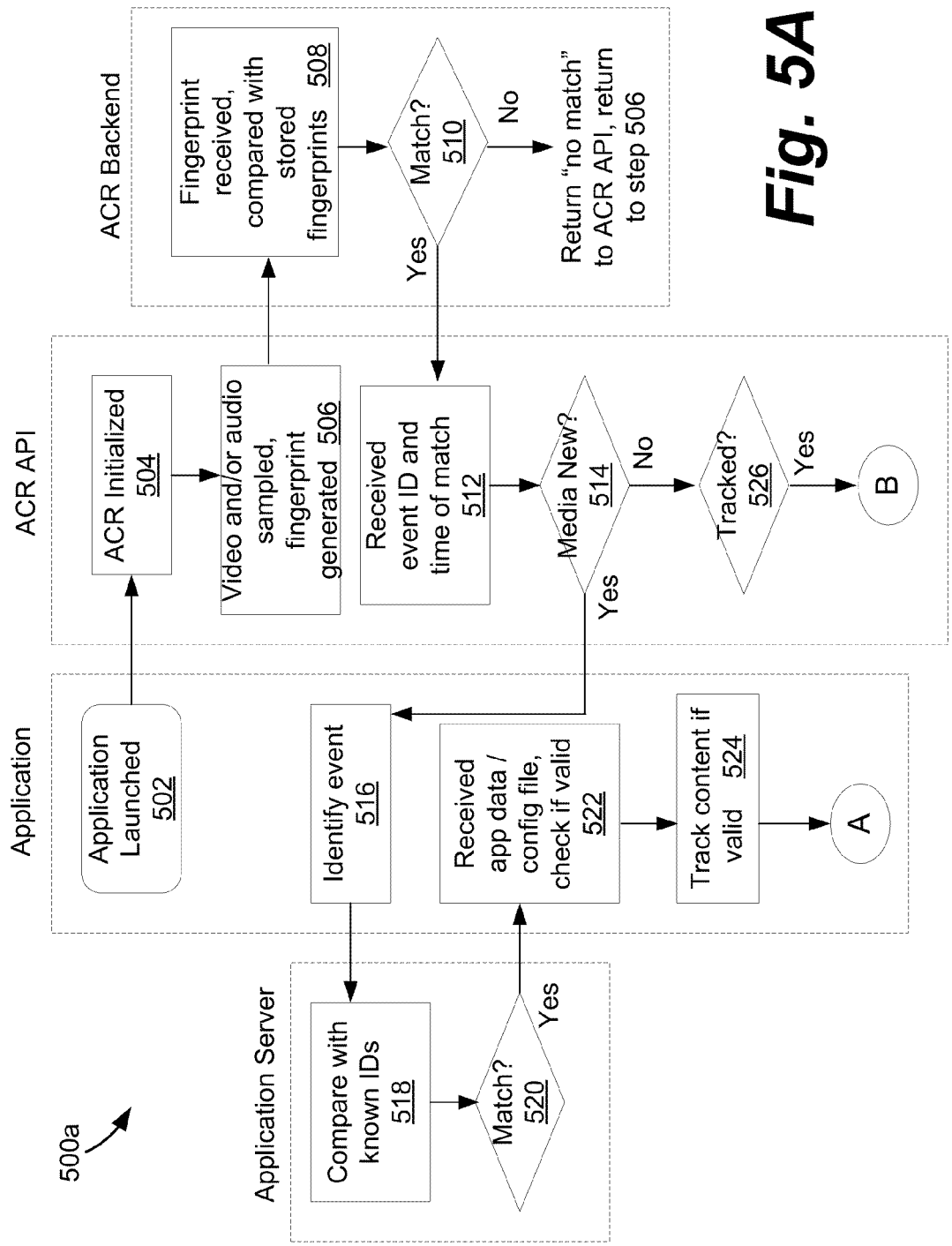
FIGS. 5A and 5B are each a flow diagram that shows exemplary steps in the operation of an exemplary automatic content recognition system, in accordance with one or more embodiments of the present invention.
Figure 5B:
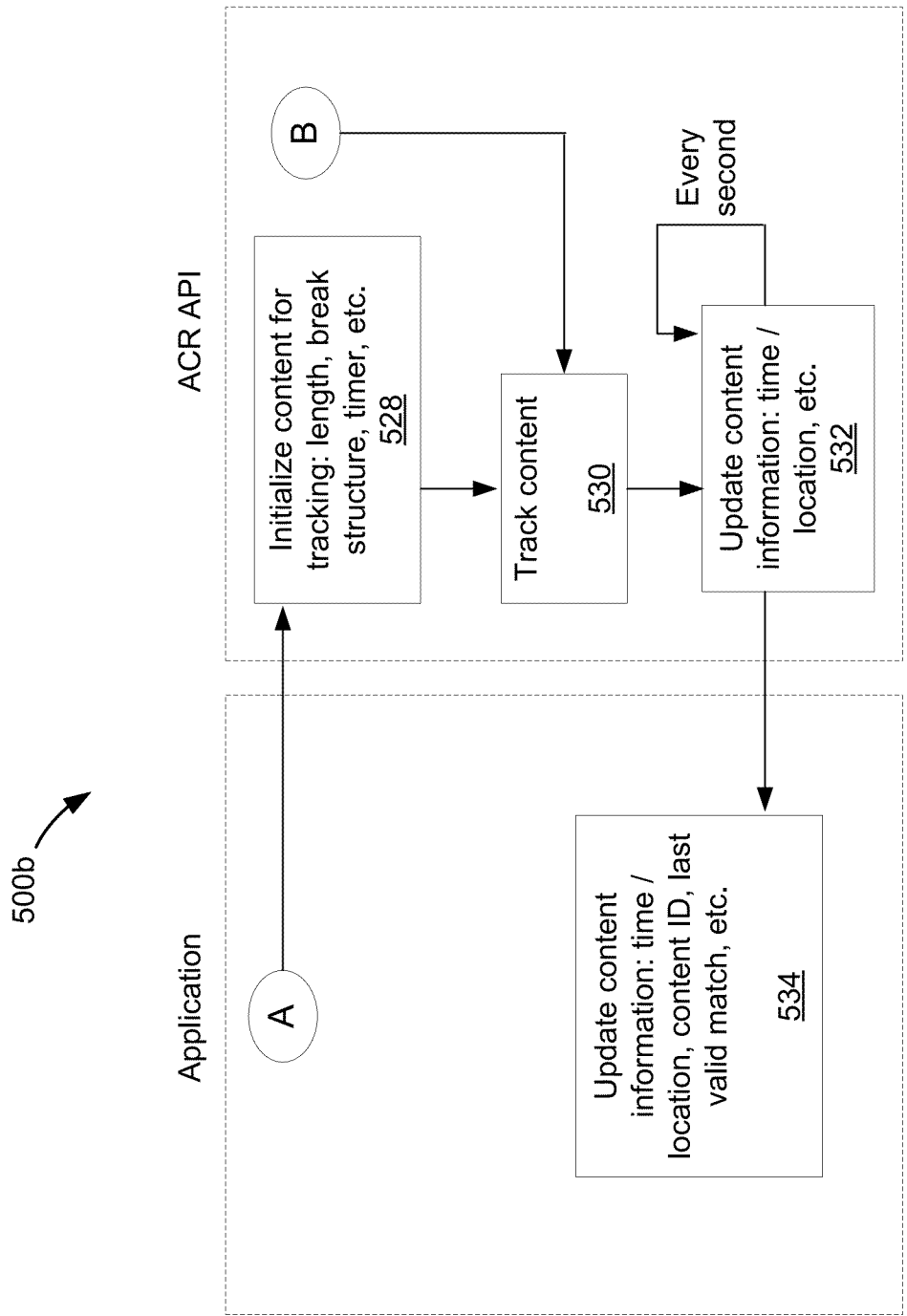

FIGS. 5A and 5B depict a flow diagram (with portions 500a, 500b) that shows exemplary steps in the operation of an exemplary ACR system, in accordance with one or more embodiments of the present invention. More specifically, FIGS. 5A and 5B show how an ACR API may initialize the tracking of new video and/or audio (media), and accordingly how components may interface and/or communicate with each other. The interfaces between components of an ACR system may conform to one or more communication protocols, including an exemplary order of communications and/or operations. The term tracking may refer to a situation where the ACR API has already acquired information about the media, for example an application configuration file and/or an event timeline, and the ACR API and the application are capable of monitoring the time and/or location of media playback and associated interactive events without communicating further with the application server. Referring to FIG. 5A, at step 502, an application (for example, application 174 of FIG. 1) may be launched on a media device. In some examples, the application may run continually in the background and/or the application may include a "listening agent" that continually monitors for events that require the application's attention. At step 504, when an application is running on the media device, an ACR API may be initialized and/or running as well. The ACR API may enable the media device to facilitate communication between an application and an ACR backend. At step 506, the ACR API, for example in conjunction with other components of the media device, may monitor the video and/or audio that displays on the media device. As the ACR API monitors the video, it may sample video and/or audio segments and generate fingerprints and communicate fingerprints to the ACR backend.

At step 508, the ACR backend may accept and handle fingerprints for video and/or audio segments communicated from the media device and/or ACR API. The ACR backend may then compare the communicated fingerprints to fingerprints stored within the ACR backend. For example, referring to FIG. 1, the ACR backend may utilize one or more fingerprint servers and one or more fingerprint matching systems. Referring again to FIG. 5A, at step 510, the ACR backend may determine whether there is a match between the communicated fingerprints and the fingerprints stored within the ACR backend. If no match occurs, the ACR backend may communicate a "no match" signal to the media device and/or ACR API, in which case the ACR API may return to step 506. At step 512, if a match occurs, the ACR backend may communicate a "match" signal to the media device and/or ACR API along with other information, for example an interactive event ID and a time of match, associated with the fingerprint. At steps 514, 526, the ACR API may determine whether the media associated with the fingerprint is new and whether it is already being tracked by the media device, meaning the media device has previously acquired information about the media, for example an associated event ID and an event timeline.

At step 516, if the ACR API determines that the media is new, the application may communicate with an application server to request application data related to the media. The application may communicate, for example, an event ID to the application server. At step 518, the application server may receive and handle the request from the application by comparing the received event ID to known event IDs. At step 520, if the application server determines that a hosted application and/or interactive event matches the event ID provided by the application, it may return related application data to the application. At step 522, the application may receive application data, for example a configuration file, from the application server and may determine if the configuration file is a valid format that can execute on the media device. At step 524, if the application data is valid, the application may determine that the media device should begin tracking the media.

Referring to FIG. 5B, at step 528, if the application determined that the media device should begin tracking the new media ('A' indicates a carry-over from a step of FIG. 5A), the ACR API may initialize the media/content to prepare it for tracking. For example, the ACR API may determine the length of the relevant video content and create a break structure, such that certain interactive events are associated with certain times in the video content. At step 530, media and/or content playing on the media device may be tracked. The media and/or content may be tracked after it was initialized (from step 528), or it may be tracked without initialization if the ACR API determined that the media was not new and was already being tracked by the media device ('B' indicates a carry-over from a step of FIG. 5A). At step 532, content may be tracked by continually (for example, every second or some other time instant) updating information related to the content, for example the play time and/or location in the content. At step 534, the application may accept content updates from the ACR API and may update the application, for example the play time and/or location in the content such that associated interactive events may be launched.

FIG. 6 is a high-level block diagram that shows a portion of an ACR system, in accordance with one or more embodiments of the present invention. As shown in FIG. 6, a variety of end-user devices 670a, . . . , 670d may be operable to properly execute one or more application(s) 674a served by app server 640 by way of a media device API 644a and/or other interfaces included in the application server 640. In one example, a vendor (for example, the vendor of media device 670a) may provide a vendor-specific API (such as API 644a)

to the entity that maintains application server 640 (or other parties that are responsible for creating applications). In this example, the entity that maintains the application server may implement an API for each vendor, in which case the vendor API's, and for example other interfaces, may be implemented within the application server 640, or related system components utilized to create and store applications. In another example, a media device vendor (for example, the vendor of media device 670a) may acquire an API provided by the entity that maintains the application server 640 (or other parties that are responsible for creating applications). In this example, the API provided by the entity that maintains the application server, and for example other interfaces, may be implemented within media devices.

API's that allow application programmers to interface with various media device vendors may provide benefits. For example, an API may allow an end-user device to perform real time downloading and invocation of applications from the app server 640. Additionally, API's may establish a single framework (or container) that can be leveraged for various applications. For example, the framework may include functions that facilitate user response data to multiple locations (e.g., user response data may be sent to two distinct locations and/or servers), the address of which may be maintained by the system or network content provider. In another example, the framework may enable the invocation of overlay windows and/or events and applications, and may facilitate data communication between multiple applications and/or overlay windows, and between applications and an external entity, for example a third-party service. In another example, the framework may enable the communication of content, data and other information to and from second-screen devices. In another example, the framework may enable the invocation of an opt-in/confirmation that allows viewers to register (for example, a registration for each application and/or each application provider). Registration may allow an application provider to track user interaction and responses, for example in a customer database (for example the customer database 142 of FIG. 1). In some examples, the framework may enable the media device to accept request events from the application server. Request events may cause the media device to initiate events/overlay windows, for example the ones previously described.

FIG. 7 is a high-level block diagram that shows a portion 700 of an exemplary automatic content recognition system, in accordance with an embodiment of the present invention. FIG. 7 also illustrates the flow of information that may occur when a media device and/or ACR backend initiate(s) an interactive event to be requested from an application server and displayed on the media device. An entity in charge of maintaining the application server 740 may create interactive events and the ACR backend 702 may assign fingerprints and event IDs to interactive events.

In the example shown in FIG. 7, the entity that maintains the application server 740 may create a political poll interactive event and/or application. The entity that maintains the application server 740 may specify to the ACR backend 702 certain video and/or audio segments and/or fingerprints that should correspond to interactive events that are hosted by the application server 740. The ACR backend 702 may determine when to trigger the poll interactive event and/or application based on whether a match is detected between video fingerprints provided by a media device 770 and video segments and/or fingerprints specified by the application server. When a match is detected by the ACR backend 702, the ACR backend may communicate to the media device 770 over network 760, signaling to the media device that it should request an interactive event with a specific ID from the application server 740. When the application server 740 receives a signal (and an interactive event ID) from an end-user device 770, the app server 740 may send application data to one or more end-user devices 770. The app server 740 may send application data to an end-user device 770 in response to receiving a signal (and an interactive event ID) from the device 770, for example.

The application data may comprise, but need not be limited to, text, banners, shapes, graphics, overlays, sidebars, applications, widgets, and/or video, for example. The application data may also comprise computer code, applications or other interactive elements that when executed by an end-user device, may present content to a viewer and allow a viewer to interact with an interactive element. The application data may be synchronized with content that is currently (or was recently) displayed on the end-user device. In one example, when application data in sent to an end-user device 470, the end-user device may display an overlay window 772 that takes up a portion of the full display 774. In this example, the full display 774 may show live programming related to a news show or an ongoing political race, for example, and the overlay window 772 may display a poll that is synchronized with the live programming. One example poll may ask the viewer of the end-user device to share their opinion about an event that just occurred in the live programming. The overlay window 772 may also include reserved sections 776, for example sections that are reserved for advertisements, sponsors, network messages or other purposes.

As illustrated in FIG. 7, an interactive event, such as a poll, may solicit a viewer response. In one example, the poll may solicit user response via a multiple choice question, although other types of responses are contemplated, such as text responses. In another example, when an interactive event and/or overlay window is presented, and opt-in to interact may be presented. If the user chooses to interact, one or more additional windows may appear, allowing the user to register and/or login with the provider of the application and/or interactive event. Once a viewer sees the interactive element on the screen of an end-user device, the user may interact, for example by responding to a poll by choosing one of the choices in a multiple choice question. The selection of a particular choice may be made utilizing a remote control and/or a second-screen device, for example.

Figure 8:
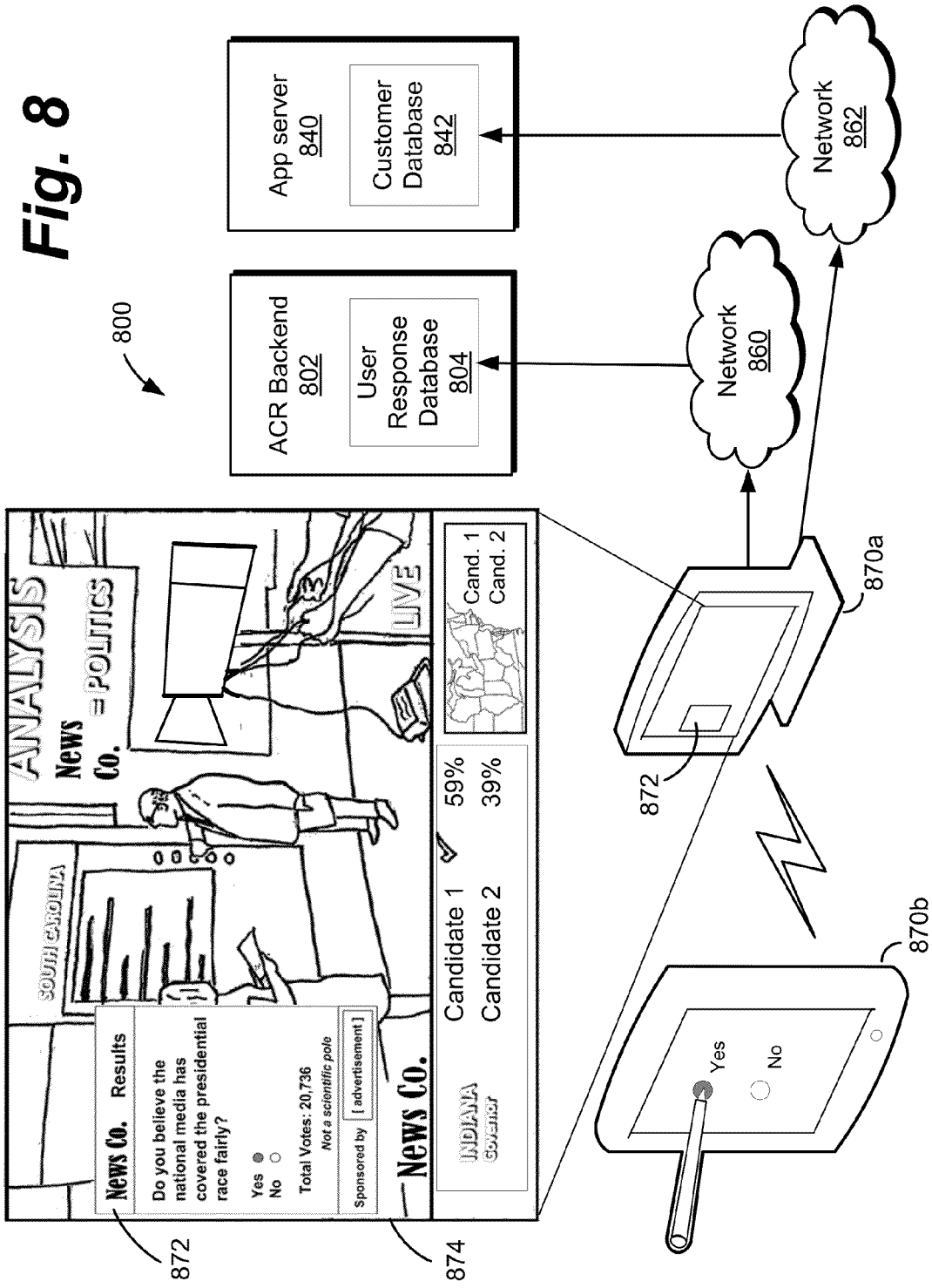
FIG. 8 is a high-level block diagram that shows a portion of an exemplary automatic content recognition system, in accordance with an embodiment of the present invention.

FIG. 8 is a high-level block diagram that shows a portion 800 of an exemplary automatic content recognition system, in accordance with an embodiment of the present invention. FIG. 8 also illustrates the flow of information that may occur when a viewer of an end-user device interacts with an interactive event and causes a response to be sent to one or more remote systems, for example an ACR backend and/or an application server. Part or all of one or more responses sent by an end-user device in response to an interactive event may be referred to as user response data. The example depicted in FIG. 8 includes a two-device (devices 870a, 870b) setup. In this example, once a viewer sees an overlay window 872 on the screen of their end-user device (device 870a and/or 870b), the viewer may interact with the related application or interactive element via a second-screen device 870b, such as a PDA, tablet or smart phone. In this example, the user may have an application installed on the second screen device 870b that enables the user to see displays, information and interactive choices that coincide with the overlay window 872 on the screen of the end-user device 870a. The viewer may then select a choice (or otherwise indicate a response) by interacting with the second-screen device 870b, for example by pressing on the screen with a stylus or the viewer's finger, or by pressing buttons on the second-screen device.

As one example, depicted in FIG. 8, it can be seen that the screen of second-screen device 870b may display interactive choices that coincide with the choices displayed in overlay window 872. A viewer may then indicate a response using the second-screen device 870b, for example, by selecting a button labeled "Yes." In the example of FIG. 8, when the viewer selects "Yes" on the second-screen device, the same choice appears as selected in the overlay window 872. The second-screen device 870b may communicate the viewer's response to the end-user device 870a by a variety of connections such as a wired connection and/or a wireless connection (e.g., WIFI, Bluetooth, infrared, and the like). Alternatively it may communicate results over network 862 directly to the application server 840.

Referring to FIG. 8, once a user responds to an interactive event, such as a poll, user response data may then be transmitted to one or more remote systems, for example an ACR backend 802 and/or an application server 840. The ACR backend 802, which may host (or be in communication with) a user response database, may collect user responses to event overlays and/or track user interaction. The application server 840, which may host (or be in communication with) a customer database, may collect user responses to event overlays and/or track user interaction. The user response data may comprise, but need not be limited to, answers to poll questions, answers to trivia questions, text responses and the like. Therefore, user response data may comprise pictures, video and/or sounds exhibited by a viewer of an end-user device. In some instances, the user response data may comprise processed information related to the viewer behavior such as behavioral recognition data.

An end-user device 870a may transmit response data via a network 860 to an ACR backend 802. An end-user device 870a may transmit response data via a network 862 to an application server 840. In some examples, network 860 and 862 may be the same network, for example, the Internet. In one example, the application server 840 may be implemented by the same system that implements the ACR backend 802. In some embodiments of the invention, the end-user device 870a may be operable to transmit response data to other servers and/or remote systems/devices.

The entity that maintains the application server 840 may maintain a customer database 842 (another example shown in FIG. 1, item 142). The customer database may be hosted by the same server as the application server, or the application server may be in communication with the customer database. The customer database may associate the user/media device to user/customer/account information, for example payment details, personal information, and the like. The customer database may track information about the user's media device, for example a unique media device identifier. If a viewer elects to interact with an application and/or interactive event, the application and/or interactive may be linked to the user's account in the customer database.

In operation, one or more components of an exemplary automatic content recognition system, for example the automatic content recognition (ACR) systems 100, 600, 700 and 800 of FIGS. 1, 6, 7 and 8, may communicate with one another to perform one or more of the methods and/or techniques described herein. For example, one or more media devices may communicate with an ACR backend 102, for example to determine whether fingerprints generated by the media devices match fingerprints stored in the ACR backend 102. The ACR backend 102 may utilize a fingerprint matching system 130, and for example other components, to determine whether a fingerprint match has occurred. The ACR backend 102 may communicate with the media devices 170 to communicate information about a match. The media devices may communicate with an application server 140 using information received from the ACR backend 102 to request application data. The application server 140 may communicate with a customer database 142 to receive user-specific information. The application server 140 may determine whether it hosts application data that matches the request sent by the media device and may communicate application data to the media device if a match occurs. The application server may comprise a media device application programming interface 644a that enables the application server to prepare application data and communicate it to the media device. Additional details regarding the operation of exemplary automatic content recognition systems may be found in flow charts and related descriptions herein.

Figure 9:
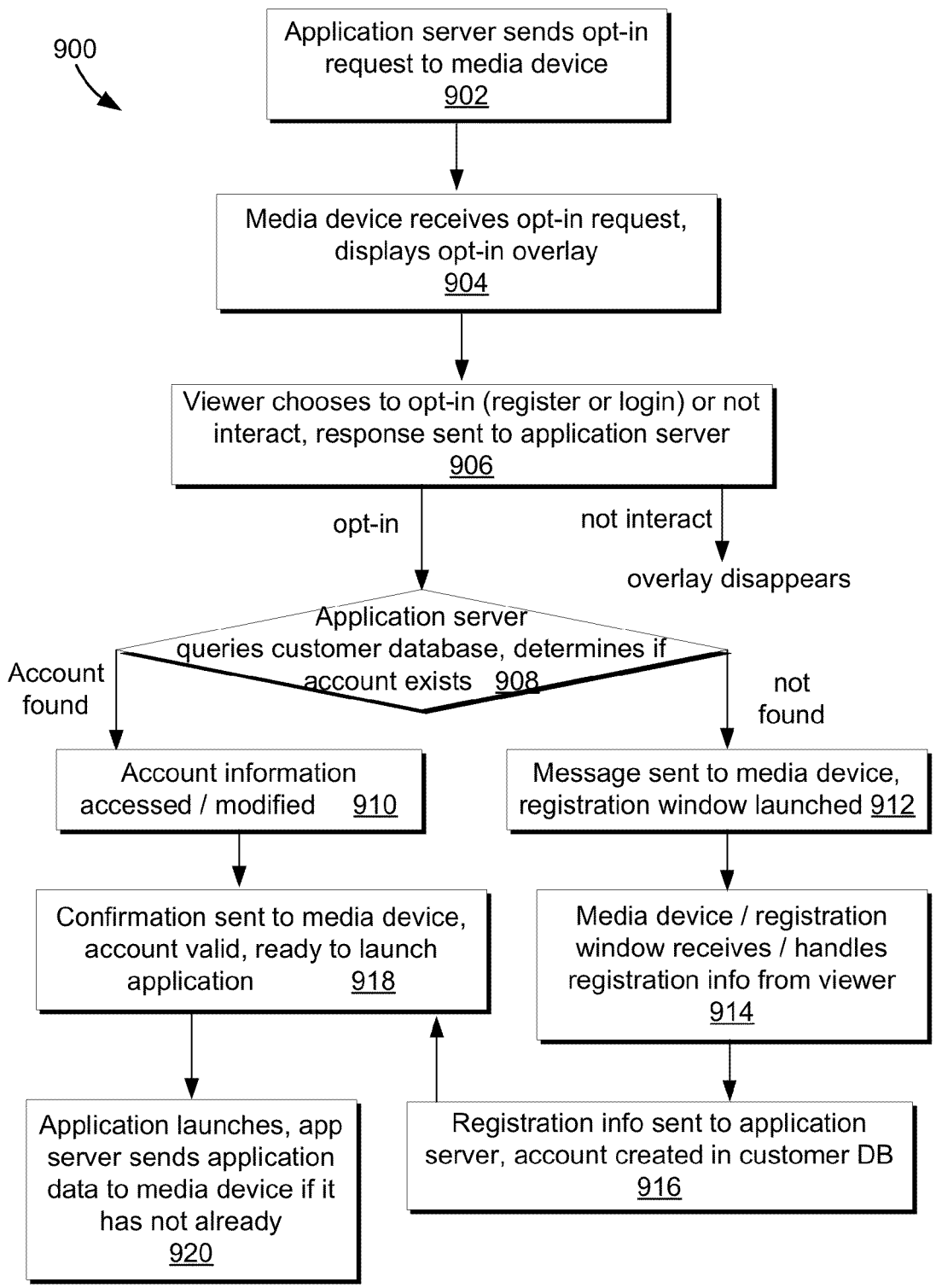
FIG. 9 is a flow diagram that shows exemplary steps in the operation of an exemplary automatic content recognition system, in accordance with one or more embodiments of the present invention.

FIG. 9 is a flow diagram 900 that shows exemplary steps in the operation of an exemplary ACR system, in accordance with one or more embodiments of the present invention. More specifically, FIG. 9 shows how a media device may register and/or login with the provider of the application and/or interactive event. In some examples, if a user chooses to interact with an interactive event, one or more additional windows may appear, allowing the user to register and/or login with the provider of the application and/or interactive event. For example, a registration application may display if this is the first time the user/media device has interacted with this application and/or application provider. The registration application may collect information from the user, for example personal information and/or information particular to a specific application, for example details required to subscribe to a political campaign event. Upon completion of registration, an event overlay window may be presented, displaying information to the viewer, for example confirmation of registration, participation in the campaign, and any transactions performed (i.e, coupon sent, shopper card credit, etc.). If the user and/or media device chooses to interact at a subsequent time and the user is already registered and/or logged in, the registration application may not be shown, unless explicitly requested, for example re-invoked from a setup page.

Referring to FIG. 9, at step 902, when a media device requests an application from the application server, the application server may first send an opt-in request to the media device. At step 904, when the media device receives the opt-in request, it may display an overlay window that includes an option to opt-in and/or engage with the application. At step 906, a viewer may choose to opt-in. If the viewer chooses not to opt in, the overlay window may disappear. If the viewer chooses to opt-in, the application may require that a valid customer account to be established in order for the application to execute properly. The viewer's response to the opt-in window may be received/handled by the media device and communicated to the application server. At step 908, the application server may determine whether a valid customer account exists by querying a customer database. In some examples, the query may comprise details about the requesting media device, for example a unique hardware identifier, the identifying being associated to a customer's account, if registered. In some examples, the query may comprise details about the viewer, for example a username, email address, password and/or the like.

At step 910, if the application server determined that a valid customer account exists, account information (in the customer database) may be accessed and/or modified. For example, a customer's credit card may be charged and/or credited based on the nature of the application. For example, a customer credit card may be credited and/or a discount may be provided for a product advertised in a commercial associated with the application. At step 912, if the application server determined that a valid customer account does not exist, a message may be communicated to the media device, and the media device may be instructed to launch a registration window and/or application. At step 914, the media device and/or registration application may receive and/or handle registration information from the viewer. In some examples, the registration information may comprise details about the media device. In some examples, registration information includes details about the viewer, for example personal information, a username, password, email address and the like. At step 916, the registration information is communicated to the application server and the application server causes a new account to be created in the customer database. At step 918, a confirmation message may be communicated to the media device. The confirmation message may display as a result of a successful account query (step 910) or as a result of a successful account registration. The confirmation message may indicate to the user that the application is ready to launch. At step 920, the application launches and/or executes on the media device. At this step, if the application requires more information, the application server may communicate such information to the media device.

Figure 10:
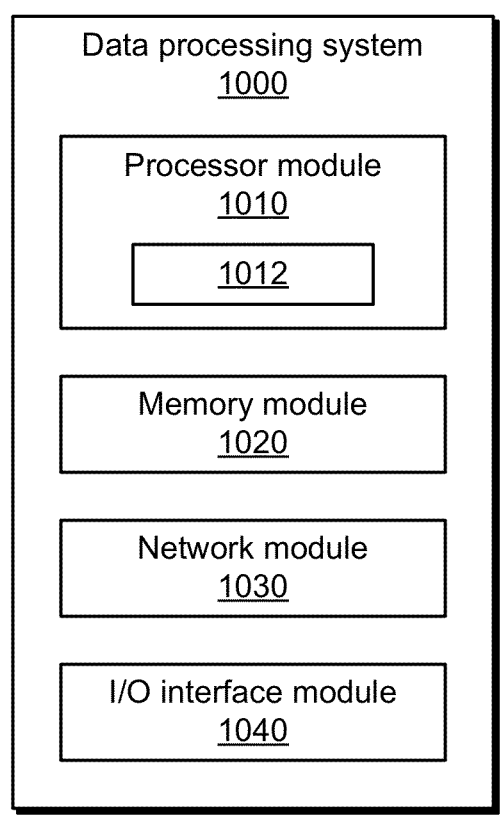
FIG. 10 is a block diagram that shows an exemplary data processing system that may be used in accordance with one or more embodiments of the present invention.

FIG. 10 is a block diagram that shows an exemplary data processing system that may be used in accordance with one or more embodiments of the present invention. Additionally, the systems, methods and/or techniques described herein may utilize more than one data processing system. For example, referring to FIG. 1, the fingerprint servers 120 may be realized in one or more data processing systems. The content ID database 110 may be realized in one or more data processing systems. The event manager 150 may be realized in one or more data processing systems. The app server 140 may be realized in one or more data processing systems. The fingerprint matching systems 130 may be realized in one or more data processing systems. The end-user devices 170 may include one or more data processing systems. Additionally, one or more of the components of system 100 shown in FIG. 1 may be realized within a single data processing system. One of skill in the art will realize that different combinations of data processing systems that realize components of system 100 may be provided without departing from the spirit and scope of the invention.

Referring to FIG. 10, there is shown a data processing system 1000 that may correspond to one or more components of an exemplary automatic content recognition system. The data processing system 1000 may comprise a processor module 1010, a memory module 1020, a network module 1030, and an input/output (I/O) interface module 1040.

The processor module 1010 may comprise suitable logic, circuitry, code, and/or interfaces that may be operable to perform the operations, functions, processes, techniques, and the like, for example one or more of the operations, functions, processes and techniques described herein. In this regard, the processor module 1010 may be operable to enable one or more components of a dial testing and audience response system. The processor module 1010 may comprise at least one processing device 1012. The processing device 1012 may be a central processing unit (CPU), a digital signal processor (DSP), and/or other type of integrated circuit that may be utilized to perform data processing operations.

The memory module 1020 may comprise suitable logic, circuitry, code, and/or interfaces that may be operable to store information utilized to enable an example dial testing and audience response system. The network module 1030 may comprise suitable logic, circuitry, code, and/or interfaces that may be operable to allow the data processing system 1000 to communicate with one or more other data processing systems (for example other data processing systems within the same dial testing and audience response system, or other data processing systems external to the same dial testing and audience response system). The network module 1030 may be operable to support one or more communication protocols such as wireline protocols and/or wireless protocols. The I/O interface module 1040 may comprise suitable logic, circuitry, code, and/or interfaces that may be operable to interact with one of more devices or other sources of interactive information such as interfaces or peripherals that allow interaction by a partner, or a device that allows a computer code to be loaded into the memory module 1020 of the data processing system.

In various embodiments of the invention, a method may be executed in a media device 170 that is operable to play video content. The media device 170 may comprise an automatic content recognition application programming interface 172. The method may comprise generating 306 via the automatic content recognition application programming interface 172, one or more video fingerprints that correspond to video content that displays on the media device. The method may comprise communicating 306, 308 via the automatic content recognition application programming interface, the one or more video fingerprints to an automatic content recognition backend system 102. The automatic content recognition backend system 102 may compare 308 the one or more video fingerprints with one or more stored video fingerprints and determines whether a match occurs. The method may comprise receiving 312 from the automatic content recognition backend system via the automatic content recognition application programming interface, one or more event identifiers associated with the one or more video fingerprints, if the match occurs. The method may comprise communicating 314, 316 the one or more event identifiers to an application server, and receiving 320 from the application server one or more interactive events and an event timeline associated with the one or more event identifiers. In some exemplary embodiments of the invention, the method may comprise receiving 312 a corresponding time of match from the automatic content recognition backend system, when the automatic content recognition backend system determines a match.

In some exemplary embodiments of the invention, the method may comprise receiving an opt-in request from the application server, and, in response to receiving the op-in request, displaying an overlay window that presents an opt-in choice to a user and allows the user to determine whether to interact. In some exemplary embodiments of the invention, the method may comprise receiving a response to the opt-in choice from the user, and communicating the response to the opt-in choice to the application server. The application server may determine whether a customer account exists. In some embodiments of the invention, the application server may communicate with a customer database 142 to determine whether a customer account exists. In some exemplary embodiments of the invention, the method may comprise receiving confirmation of a valid customer account from the application server.

In some exemplary embodiments of the invention, the method may comprise displaying a registration window that allows a user to enter registration information, when the application server determined that the customer account did not exist. The method may comprise communicating the registration information to the application server 140. The application server may cause a new customer account to be created in the customer database 142.

In some exemplary embodiments of the invention, the method may comprise generating a break structure 322, 528 related to the video content utilizing the event timeline. One or more of the interactive events may be associated with one or more playback times in the video content. The method may comprise executing 530, 532 the one or more interactive events by tracking the video content and referencing the break structure. The method may comprise receiving a user response to the one or more interactive events, generating user response data and transmitting the user response data to the automatic content recognition backend system 102. The method may comprise receiving a user response to the one or more interactive events, generating user response data and transmitted the user response data to the application server 140. In some exemplary embodiments of the invention, the application server 140, 640 utilizes a media device application programming interface 644a to generate the one or more interactive events.

In some exemplary embodiments of the invention, the method may comprise continually executing the generating one or more video fingerprints step, and continually executing the receiving from the application server one or more interactive events step. The method may include updating information associated with the one or more interactive events or receiving one or more new interactive events.

Another embodiment of the present disclosure may provide a non-transitory machine and/or computer readable storage and/or media, having stored thereon, a machine code and/or a computer program having at least one code section executable by a machine, computer and/or data processing system, thereby causing the machine, computer and/or data processing system to perform the steps as described herein for implementing various operational protocols for an automatic content recognition system.

Accordingly, the present disclosure may be realized in hardware, software, or a combination of hardware and software. The present disclosure may be realized in a centralized fashion in at least one machine, computer and/or data processing system; or in a distributed fashion where different elements are spread across several interconnected machines, computers and/or data processing systems. Any kind of machine, computer and/or data processing system or other apparatus adapted for carrying out the methods described herein is suited. A typical combination of hardware and software may be a general-purpose computer system with a computer program that, when being loaded and executed, controls the computer system such that it carries out the methods and techniques described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present disclosure. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
   in a media device comprising an automatic content recognition application programming interface, the media device being operable to play video content:
   generating via the automatic content recognition application programming interface, one or more video fingerprints that correspond to video content that displays on the media device;
   communicating via the automatic content recognition application programming interface, the one or more video fingerprints to an automatic content recognition backend system for a determination of whether the one or more video fingerprints matches one or more stored video fingerprints;
   receiving from the automatic content recognition backend system via the automatic content recognition application programming interface, one or more interactive event identifiers associated with the one or more video fingerprints, if the match occurs;
   communicating the one or more interactive event identifiers to an application server;
   receiving from the application server one or more interactive events and an event timeline associated with the one or more interactive event identifiers; and
   generating a break structure related to the video content utilizing the event timeline, wherein one or more of the interactive events are associated with one or more playback times in the video content.

2. The method according to claim 1, comprising:
   receiving an opt-in request from the application server; and
   in response to receiving the op-in request, displaying an overlay window that presents an opt-in choice to a user and allows the user to determine whether to interact.

3. The method according to claim 2, comprising:
   receiving a response to the opt-in choice from the user; and
   communicating the response to the opt-in choice to the application server for a determination of whether a customer account exists.

4. The method according to claim 3, comprising:
   displaying a registration window that allows a user to enter registration information, when it is determined that the customer account does not exist; and
   communicating the registration information to the application server for creation of a new customer account.

5. The method according to claim 3, comprising receiving confirmation of a valid customer account from the application server.

6. The method according to claim 1, comprising executing the one or more interactive events by tracking the video content and referencing the break structure.

7. The method according to claim 6, comprising:
   receiving a user response to the one or more interactive events and generating user response data; and
   transmitting the user response data to the automatic content recognition backend system.

8. The method according to claim 6, comprising:
   receiving a user response to the one or more interactive events and generating user response data; and
   transmitting the user response data to the application server.

9. The method according to claim 6, comprising:
continually executing the generating one or more video fingerprints step, and continually executing the receiving from the application server one or more interactive events step; and
updating information associated with the one or more interactive events or receiving one or more new interactive events.

10. The method according to claim 6, wherein a media device application programming interface is used to generate the one or more interactive events.

11. The method according to claim 1, comprising receiving a corresponding time of match from the automatic content recognition backend system, when the automatic content recognition backend system determines a match.

12. A system, the system comprising:
a media device operable to play video content, the media device comprising an automatic content recognition application programming interface, the media device being operable to:
generate via the automatic content recognition application programming interface, one or more video fingerprints that correspond to video content that displays on the media device;
communicate via the automatic content recognition application programming interface, the one or more video fingerprints to an automatic content recognition backend system for a determination of whether the one or more video fingerprints match one or more stored video fingerprints;
receive from the automatic content recognition backend system via the automatic content recognition application programming interface, one or more interactive event identifiers associated with the one or more video fingerprints, if the match occurs;
communicate the one or more interactive event identifiers to an application server; and
receive from the application server one or more interactive events and an event timeline associated with the one or more interactive event identifiers;
wherein the media device is operable to generate a break structure related to the video content utilizing the event timeline, wherein one or more of the interactive events are associated with one or more playback times in the video content.

13. The system according to claim 12, wherein the media device is operable to:
receive an opt-in request from the application server; and
display an overlay window that presents an opt-in choice to a user and allows the user to determine whether to interact, in response to receiving the op-in request.

14. The system according to claim 13, wherein the media device is operable to:
receive a response to the opt-in choice from the user; and
communicate the response to the opt-in choice to the application server for a determination of whether a customer account exists.

15. The system according to claim 14, wherein the media device is operable to:
display a registration window that allows a user to enter registration information, when the application server determined that the customer account did not exist; and
communicate the registration information to the application server for creation of a new customer account.

16. The system according to claim 15, wherein the media device is operable to receive confirmation of a valid customer account from the application server.

17. The system according to claim 12, wherein the media device is operable to execute the one or more interactive events by tracking the video content and referencing the break structure.

18. The system according to claim 17, wherein the media device is operable to:
receive a user response to the one or more interactive events and generating user response data; and
transmit the user response data to the automatic content recognition backend system.

* * * * *

UNITED STATES PATENT AND TRADEMARK OFFICE
CERTIFICATE OF CORRECTION

PATENT NO.         : 8,776,105 B2  
APPLICATION NO.    : 13/730656  
DATED              : July 8, 2014  
INVENTOR(S)        : Nishith Kumar Sinha Page 1 of 1

It is certified that error appears in the above-identified patent and that said Letters Patent is hereby corrected as shown below:

On the Title Page, Item (73), should read as:

Assignee: Turner Broadcasting System, Inc.

Signed and Sealed this
Seventeenth Day of February, 2015

Michelle K. Lee
*Deputy Director of the United States Patent and Trademark Office*